US012592565B2

(12) United States Patent
Wang et al.

(10) Patent No.: US 12,592,565 B2
(45) Date of Patent: Mar. 31, 2026

(54) BACKUP APPARATUS AND POWER CONVERTER

(71) Applicant: Huawei Digital Power Technologies Co., Ltd., Shenzhen (CN)

(72) Inventors: Hang Wang, Kista (SE); Wei Chen, Xi'an (CN); Xuhao Wang, Xi'an (CN); Yunhui Guo, Shenzhen (CN); Fanfan Xing, Shenzhen (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/991,897

(22) Filed: Dec. 23, 2024

(65) Prior Publication Data

US 2025/0210995 A1      Jun. 26, 2025

(30) Foreign Application Priority Data

Dec. 26, 2023     (CN) .......................... 202311818513.9

(51) Int. Cl.
*H02J 3/32*          (2006.01)
*H02J 3/38*          (2006.01)
*H02M 3/07*          (2006.01)

(52) U.S. Cl.
CPC ................ *H02J 3/32* (2013.01); *H02J 3/381* (2013.01); *H02M 3/072* (2021.05); *H02J 2203/10* (2020.01); *H02J 2300/24* (2020.01)

(58) Field of Classification Search
CPC .......... H02J 3/32; H02J 3/381; H02J 2300/24; H02J 2203/10; H02M 3/072
See application file for complete search history.

(56) References Cited

U.S. PATENT DOCUMENTS

| | | | |
|---|---|---|---|
| 2017/0099015 A1* | 4/2017 | Shi ........................... | H02M 1/36 |
| 2017/0331293 A1* | 11/2017 | Narla ....................... | H02J 3/381 |
| 2018/0006464 A1* | 1/2018 | Judkins ................... | H02S 40/32 |
| 2022/0181884 A1* | 6/2022 | Wang ....................... | H02J 3/381 |

* cited by examiner

*Primary Examiner* — Rexford N Barnie
*Assistant Examiner* — Duc M Pham
(74) *Attorney, Agent, or Firm* — Maier & Maier, PLLC

(57)          ABSTRACT

A backup apparatus includes a contactor, a first rectifier circuit, an auxiliary power supply circuit, a first switch, a second switch, and a controller. The contactor includes a coil connected to the auxiliary power supply circuit through the second switch and a main contact switch connected to a power grid. The first rectifier circuit is connected to the power grid through the first switch, and the first rectifier circuit is connected to the coil. When the first switch is turned on, the first rectifier circuit supplies power to the coil. After the main contact switch is turned on, the controller controls the second switch to be turned on and the first switch to be turned off. When the second switch is turned on and a voltage of the power grid is lower than a voltage threshold, an input capacitor in the auxiliary power supply circuit supplies power to the coil.

20 Claims, 5 Drawing Sheets

BACKUP APPARATUS AND POWER CONVERTER

CROSS-REFERENCE OF RELATED APPLICATION

This application claims priority to Chinese Patent Application No. 202311818513.9, filed on Dec. 26, 2023, the disclosure of which is hereby incorporated by reference in its entirety.

TECHNICAL FIELD

The embodiments relate to the power electronics field, and in particular, to a backup apparatus and a power converter.

BACKGROUND

In a photovoltaic or photovoltaic energy storage power supply scenario, as an apparatus connected between a power converter and a power grid, a backup box can automatically control grid-connected/off-grid switching of the power converter based on a voltage of the power grid and an operating status of the power converter, to normally supply power to a load when the voltage of the power grid fluctuates. The backup box usually obtains power from the power grid. When the voltage of the power grid is normal, a contactor in the backup box is closed, to connect the power converter to the power grid. Alternatively, when the voltage of the power grid is excessively low, the contactor in the backup box is opened, to disconnect the power converter from the power grid. Voltages of some national power grids experience low voltage ride-through situations. To be specific, the voltage of the power grid drops to a low voltage and then recovers after a specific period of time. In this process, a power converter is required to keep running in a grid-connected state. However, a contactor in a main circuit switch of a backup box is driven by the voltage of the power grid. In a low voltage ride-through scenario of the power grid, the contactor cannot remain in a closed state. Therefore, a problem that needs to be urgently resolved currently is to provide a backup box applied to the photovoltaic or photovoltaic energy storage power supply scenario, so that in a low voltage ride-through scenario of a power grid and a power supply system upgrade scenario, a contactor can remain in a closed state to keep a power converter grid-connected.

SUMMARY

Embodiments provide a backup apparatus and a power converter, to keep the power converter grid-connected during low voltage ride-through of a power grid, and therefore improve operating reliability of the power converter under the low voltage ride-through of the power grid.

According to a first aspect, the embodiments provide a backup apparatus. The backup apparatus includes a contactor, a first rectifier circuit, an auxiliary power supply circuit, a first switch, a second switch, and a controller, the contactor includes a coil and a main contact switch, the main contact switch is connected between a power grid and a power converter, an input of the first rectifier circuit is connected to the power grid through the first switch, an output of the first rectifier circuit is connected to the coil, the coil is further connected to the auxiliary power supply circuit through the second switch, and the power converter includes a photovoltaic inverter and a power conversion system. The first rectifier circuit is configured to: when the first switch is turned on, convert an alternating current from the power grid into a direct current to supply power to the coil, to turn on the main contact switch. The controller is configured to: after the main contact switch is turned on, control the second switch to be turned on and the first switch to be turned off, so that the auxiliary power supply circuit converts an alternating current from the power grid or the power converter into a direct current to supply power to the coil, to keep the main contact switch on. The auxiliary power supply circuit includes an input capacitor, and when the second switch is turned on, the input capacitor supplies power to the coil when a voltage of the power grid is lower than a voltage threshold.

In the embodiments, when the first switch is turned on, the first rectifier circuit in the backup apparatus converts the alternating current from the power grid into the direct current to supply power to the coil. The direct current output by the first rectifier circuit can ensure that sufficient electromagnetic force is generated on an iron core around which the coil is wound, to drive the main contact switch to be turned on. After the main contact switch is turned on, the power converter is connected to the power grid, in other words, operates in a grid-connected mode. After the main contact switch is turned on, the controller controls the second switch to be turned on and the first switch to be turned off, so that the auxiliary power supply circuit converts the alternating current from the power grid or the power converter into the direct current to supply power to the coil, to keep the main contact switch on. When low voltage ride-through occurs in the power grid, the auxiliary power supply circuit supplies power to the coil by using electric energy stored in the input capacitor. Low voltage ride-through duration of the power grid is short, and the electric energy stored in the input capacitor can ensure that power is continuously supplied to the coil within a specific period of time. Therefore, during the low voltage ride-through of the power grid, the main contact switch is kept on to keep the power converter grid-connected, so that operating reliability of the power converter under the low voltage ride-through of the power grid is improved.

In a possible implementation, the auxiliary power supply circuit includes a second rectifier circuit and a buck circuit that are connected in series, the buck circuit includes the input capacitor, the input capacitor is connected to an output of the second rectifier circuit, the second rectifier circuit is configured to convert the alternating current from the power grid or the power converter into the direct current, and the buck circuit is configured to reduce a voltage of the direct current from the second rectifier circuit and transmit a bucked direct current to the coil. When the low voltage ride-through occurs in the power grid, power is supplied to the coil by using the electric energy stored in the input capacitor. The low voltage ride-through duration of the power grid is short, and the electric energy stored in the input capacitor can ensure that power is continuously supplied to the coil within the specific period of time. Therefore, during the low voltage ride-through of the power grid, the main contact switch is kept on to keep the power converter grid-connected, so that the operating reliability of the power converter under the low voltage ride-through of the power grid is improved. In addition, the buck circuit outputs a low-voltage direct current to maintain power supply to the coil, so that heat generated by the coil during turn-on of the main contact switch can be reduced.

In a possible implementation, the backup apparatus includes a third switch, the third switch is connected in series between the first rectifier circuit and the coil, and the controller is configured to control, when the voltage of the power grid is higher than a safety threshold, the third switch to be turned off. Herein, when a short-circuit fault occurs on the first switch, the first switch cannot be normally turned off, and consequently a high-voltage current enters the coil. The controller may turn off the third switch when detecting that the voltage of the power grid is excessively high, to avoid further component damage caused by excessively high voltages at two ends of the coil.

In a possible implementation, the backup apparatus includes a first diode, an anode of the first diode is connected to the second switch, and a cathode of the first diode is connected to the coil. The first diode can prevent a high-voltage direct current output by the first rectifier circuit from entering the auxiliary power supply circuit, and avoid damage to the auxiliary power supply circuit caused by current backflow.

In a possible implementation, the backup apparatus includes a second diode, and the second diode is connected in parallel to the coil. The second diode can form a free-wheeling path with the coil in a process from energizing to de-energizing the coil, to avoid an abrupt change of a current on the coil after the first switch is turned off.

In a possible implementation, the controller is configured to: after the voltage of the power grid is lower than the voltage threshold and specified time is exceeded, control the second switch to be turned off. Herein, after the voltage of the power grid is lower than the voltage threshold and the specified time is exceeded, the current power converter is controlled to run off-grid, to avoid impact of an excessively low voltage of the power grid on power supply to a load.

In a possible implementation, the controller is configured to: after the main contact switch is turned on, control the second switch to be turned on; and after keeping the second switch on for preset time, control the first switch to be turned off. After the main contact switch is turned on, the controller controls the second switch to be turned on. It takes a specific period of time for the auxiliary power supply circuit connected to the second switch to obtain power from the power grid and output a direct current. Therefore, to avoid a case in which the main contact switch is turned off due to insufficient power supply to the coil when the first switch is turned off, after the second switch is turned on and is kept on for the preset time, the first switch is controlled to be turned off, in other words, the first switch is turned off after it is ensured that power supply of the auxiliary power supply circuit can keep the main contact switch on. This further ensures grid connection reliability of the power converter.

According to a second aspect, the embodiments provide a power converter. The power converter includes an inverter circuit, a backup apparatus, and a controller, the inverter circuit is configured to convert a direct current from a photovoltaic module or an energy storage battery into an alternating current, the backup apparatus includes a contactor, a first rectifier circuit, a first switch, a second switch, and an auxiliary power supply circuit, the contactor includes a coil and a main contact switch, the main contact switch is connected between a power grid and the inverter circuit, an input of the first rectifier circuit is connected to the power grid through the first switch, an output of the first rectifier circuit is connected to the coil, and the coil is further connected to the auxiliary power supply circuit through the second switch. The first rectifier circuit is configured to: when the first switch is turned on, convert an alternating current from the power grid into a direct current to supply power to the coil, to turn on the main contact switch. The controller is configured to: after the main contact switch is turned on, control the second switch to be turned on and the first switch to be turned off, so that the auxiliary power supply circuit converts an alternating current from the power grid or the power converter into a direct current to supply power to the coil, to keep the main contact switch on. The auxiliary power supply circuit includes an input capacitor, and when the second switch is turned on, the input capacitor supplies power to the coil when a voltage of the power grid is lower than a voltage threshold. When low voltage ride-through occurs in the power grid, power is supplied to the coil by using electric energy stored in the input capacitor. Low voltage ride-through duration of the power grid is short, and the electric energy stored in the input capacitor can ensure that power is continuously supplied to the coil within a specific period of time. Therefore, during the low voltage ride-through of the power grid, the main contact switch is kept on to keep the power converter grid-connected, so that operating reliability of the power converter under the low voltage ride-through of the power grid is improved.

In a possible implementation, the auxiliary power supply circuit includes a second rectifier circuit and a buck circuit that are connected in series, the buck circuit includes the input capacitor, the input capacitor is connected to an output of the second rectifier circuit, the second rectifier circuit is configured to convert the alternating current from the power grid or the power converter into the direct current, and the buck circuit is configured to reduce a voltage of the direct current from the second rectifier circuit and transmit a bucked direct current to the coil. During the low voltage ride-through of the power grid, power is supplied to the coil by using the electric energy stored in the input capacitor. The low voltage ride-through duration of the power grid is short, and the electric energy stored in the input capacitor can ensure that power is continuously supplied to the coil within the specific period of time. Therefore, during the low voltage ride-through of the power grid, the main contact switch is kept on to keep the power converter grid-connected, so that the operating reliability of the power converter under the low voltage ride-through of the power grid is improved. In addition, the buck circuit outputs a low-voltage direct current to maintain power supply to the coil, so that heat generated by the coil during turn-on of the main contact switch can be reduced.

In a possible implementation, the backup apparatus includes a third switch, the third switch is connected in series between the first rectifier circuit and the coil, and the controller is configured to control, when the voltage of the power grid is higher than a safety threshold, the third switch to be turned off. Herein, when a short-circuit fault occurs on the first switch, the first switch cannot be normally turned off, and consequently a high-voltage current enters the coil. The controller may turn off the third switch when detecting that the voltage of the power grid is excessively high, to avoid further component damage caused by excessively high voltages at two ends of the coil.

In a possible implementation, the backup apparatus includes a first diode, an anode of the first diode is connected to the second switch, and a cathode of the first diode is connected to the coil. The first diode can prevent a high-voltage direct current output by the first rectifier circuit from entering the auxiliary power supply circuit, and avoid damage to the auxiliary power supply circuit caused by current backflow.

In a possible implementation, the backup apparatus includes a second diode, and the second diode is connected in parallel to the coil. The second diode can form a freewheeling path with the coil in a process from energizing to de-energizing the coil, to avoid an abrupt change of a current on the coil after the first switch is turned off.

DETAILED DESCRIPTION OF EMBODIMENTS

Figure 1:
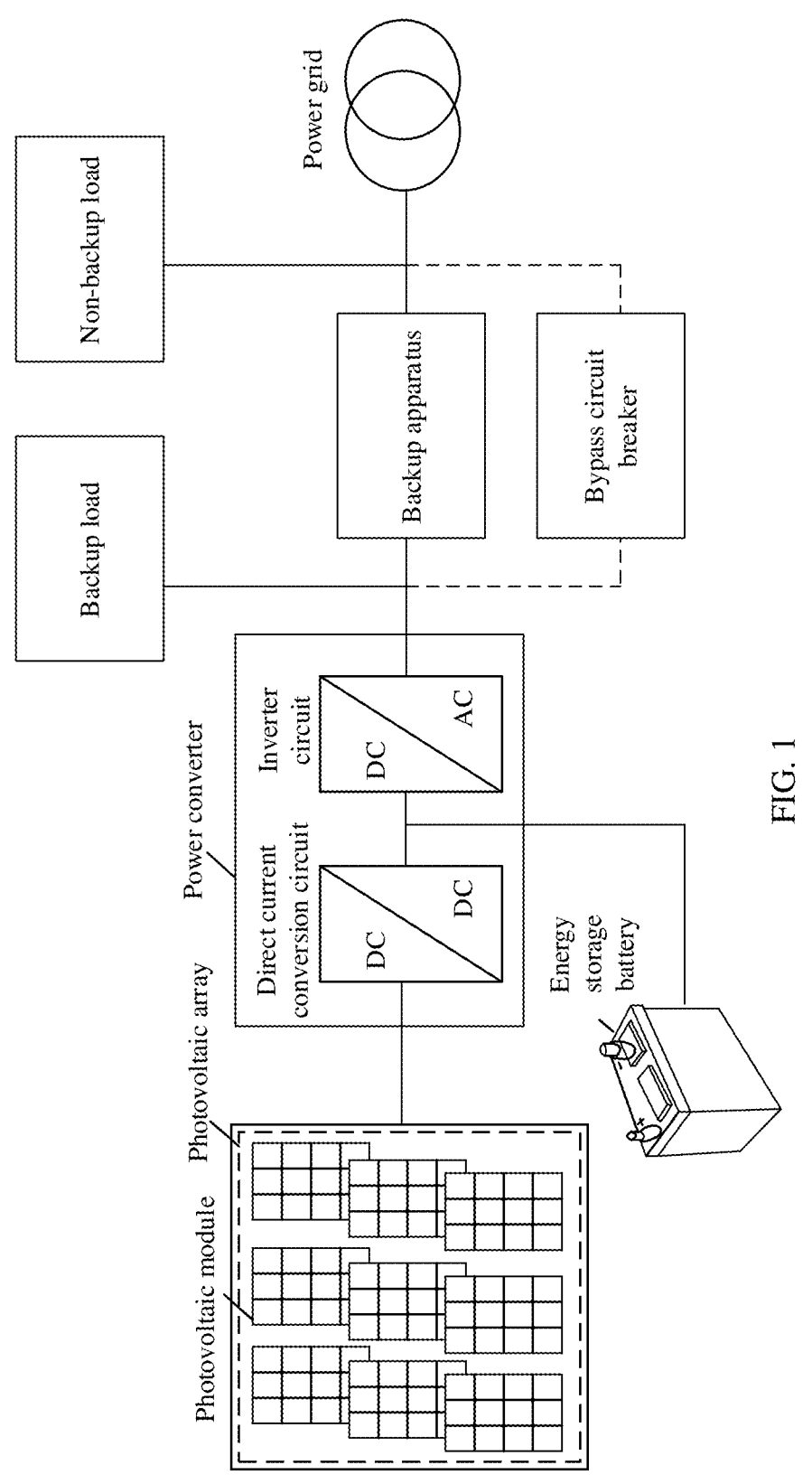
FIG. 1 is a diagram of an application scenario of a power supply system according to the embodiments.

FIG. 1 is a diagram of an application scenario of a power supply system according to the embodiments. The power supply system provided in the embodiments may include a direct current power supply, a power converter, and a backup apparatus. The direct current power supply may be a photovoltaic array. The photovoltaic array includes a plurality of photovoltaic modules connected in series or in parallel. An output of the photovoltaic module may be connected to an input of the power converter. Herein, the power converter may include a direct current conversion circuit and an inverter circuit. An input of the direct current conversion circuit may be connected to the photovoltaic module, an output of the direct current conversion circuit may be connected to an input of the inverter circuit, an output of the inverter circuit is configured to connect to one end of the backup apparatus and a backup load, and the other end of the backup apparatus is configured to connect to a power grid and a non-backup load. Herein, when a voltage output by the power grid is not lower than a voltage threshold, the backup apparatus connects the power converter to the power grid, in other words, the power converter is grid-connected. When the power converter is grid-connected, the power converter may perform, through the direct current conversion circuit, voltage transformation on a direct current provided by the photovoltaic array, and perform, through the inverter circuit, inversion conversion on a direct current obtained after the voltage transformation. The power converter supplies power to the backup load and the non-backup load with an alternating current obtained after the inversion conversion and an alternating current from the power grid. When the voltage output by the power grid is lower than the voltage threshold, the backup apparatus disconnects the power converter from the power grid, in other words, the power converter is off-grid. When the power converter is off-grid, the power converter may perform, through the direct current conversion circuit, voltage transformation on a direct current provided by the photovoltaic array, and perform, through the inverter circuit, inversion conversion on a direct current obtained after the voltage transformation, to output an alternating current obtained after the inversion conversion to the backup load for power supply. In a home power supply scenario, the backup load may be an important load in a home of a user, for example, a household appliance or an alarm device, and is not powered off when the power grid has no power. The non-backup load may be a non-important load in the home of the user, for example, a charging pile, and does not supply power when the power grid has no power, to ensure that the backup load can supply power for a longer period of time. In addition, when the voltage output by the power grid is not lower than the voltage threshold, and the backup apparatus cannot automatically connect the power converter to the power grid, a bypass circuit breaker may be manually closed, to restore power supply to the backup load and the non-backup load.

In some implementations, still refer to FIG. 1. The direct current power supply may further include an energy storage battery. An output of the energy storage battery may be connected to the output of the direct current conversion circuit in the power converter, and the energy storage battery may provide a direct current for the inverter circuit. The inverter circuit performs inversion conversion on the direct current provided by the energy storage battery, and outputs an alternating current obtained after the inversion conversion to the backup load and the non-backup load for power supply.

In some implementations, after voltage transformation is performed on the direct current provided by the photovoltaic array in FIG. 1 through the direct current conversion circuit in the power converter, the energy storage battery may be charged based on a direct current output by the power converter.

In the application scenario shown in FIG. 1, the backup apparatus obtains power from the power grid. When the voltage of the power grid is normal, a contactor in a backup apparatus is closed based on power supply of the power grid, to connect the power converter to the power grid. Alternatively, when it is detected that the voltage of the power grid is excessively low, the contactor in the backup apparatus is opened, to disconnect the power converter from the power grid. Voltages of some national power grids experience low voltage ride-through situations. For example, the voltage of the power grid drops to a low voltage and then recovers after a specific period of time. In this process, a power converter is required to keep running in a grid-connected state. However, a contactor in a main circuit switch of a backup apparatus is driven by the voltage of the power grid. In a low voltage ride-through scenario of the power grid, the contactor cannot remain in a closed state, and the power converter cannot operate in a grid-connected mode. Consequently, operating reliability of the power converter under low voltage ride-through is low.

In the power supply system provided in the embodiments, the backup apparatus may include the contactor, a first rectifier circuit, an auxiliary power supply circuit, and a controller (not shown in FIG. 1). The contactor includes a coil and a main contact switch, a first end of the main contact switch is configured to connect to the power grid, a second end of the main contact switch is configured to connect to the power converter, and the main contact switch remains off when the coil is de-energized. An input of the first rectifier circuit is connected to the power grid, a positive output of the first rectifier circuit is connected to a first end of the coil, a negative output of the first rectifier circuit is grounded, the first end of the coil is connected to the auxiliary power supply circuit, and a second end of the coil is grounded. The first rectifier circuit is configured to convert an alternating current from the power grid into a direct current to supply power to the coil, so that electromagnetic force is generated on an iron core around which the coil is wound, to drive the main contact switch to be turned on. After the main contact switch is turned on, the power converter is connected to the power grid, in other words, operates in a grid-connected mode. After the main contact switch is turned on, the controller converts an alternating current from the power grid or the power converter into a direct current through the auxiliary power supply circuit to supply power to the coil, to keep the main contact switch on. Herein, when the voltage of the power grid is normal, an input capacitor in the auxiliary power supply circuit stores electric energy based on power supply of the power grid. When low voltage ride-through occurs in the power grid, the auxiliary power supply circuit supplies power to the coil by using the electric energy stored in the input capacitor. Low voltage ride-through duration of the power grid is short, and the electric energy stored in the input capacitor can ensure that power is continuously supplied to the coil within a specific period of time. Therefore, during the low voltage ride-through of the power grid, the main contact switch is kept on to keep the power converter grid-connected, so that operating reliability of the power converter under the low voltage ride-through of the power grid is improved.

Figure 2:
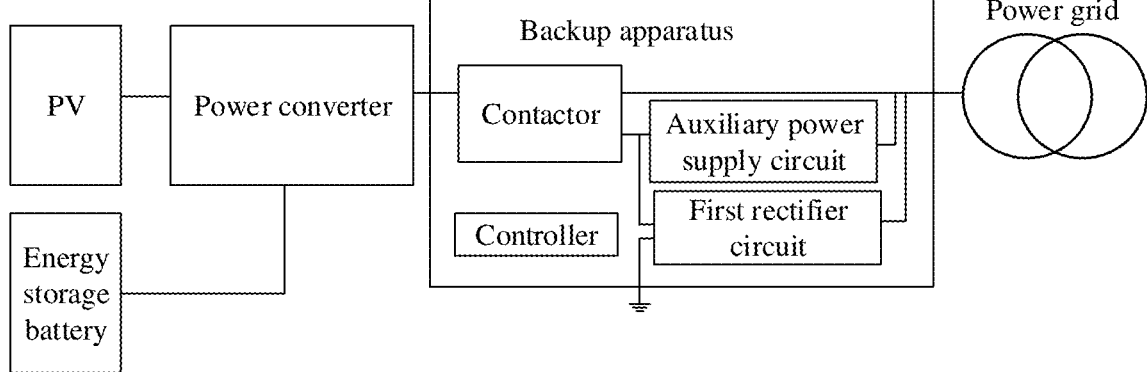
FIG. 2 is a diagram of a structure of a power supply system according to the embodiments.

FIG. 2 is a diagram of a structure of a power supply system according to the embodiments. The power supply system shown in FIG. 2 includes a photovoltaic module PV, an energy storage battery, a power converter, and a backup apparatus. An input of the power converter is configured to connect to the photovoltaic module PV and the energy storage battery, and an output of the power converter is configured to connect to a power grid through the backup apparatus. The backup apparatus may include a contactor, a first rectifier circuit, an auxiliary power supply circuit, and a controller. An input of the first rectifier circuit is connected to the power grid through a first switch (not shown in FIG. 2). For example, the first switch may be a relay. The input of the first rectifier circuit may be connected to a neutral wire of the power grid through a first switch, and connected to a live wire of the power grid through another first switch. A positive output of the first rectifier circuit is connected to a first end of a coil (not shown in FIG. 2) in the contactor, a negative output of the first rectifier circuit is grounded, the first end of the coil is further connected to the auxiliary power supply circuit through a second switch (not shown in FIG. 2), and a second end of the coil is grounded, where the second switch may be a switching transistor. When the first switch is turned on, the first rectifier circuit is configured to convert an alternating current from the power grid into a direct current to supply power to the coil, so that electromagnetic force is generated on an iron core around which the coil is wound, to drive a main contact switch to be turned on. After the main contact switch is turned on, the power converter is connected to the power grid, in other words, operates in a grid-connected mode. After the main contact switch is turned on, the controller controls the second switch to be turned on and the first switch to be turned off, so that the auxiliary power supply circuit converts an alternating current from the power grid or the power converter into a direct current to supply power to the coil, to keep the main contact switch on. Herein, when a voltage of the power grid is normal, an input capacitor in the auxiliary power supply circuit stores electric energy based on power supply of the power grid. When low voltage ride-through occurs in the power grid, the auxiliary power supply circuit supplies power to the coil by using the electric energy stored in the input capacitor. Low voltage ride-through duration of the power grid is short, and the electric energy stored in the input capacitor can ensure that power is continuously supplied to the coil within a specific period of time. Therefore, during the low voltage ride-through of the power grid, the main contact switch is kept on to keep the power converter grid-connected, so that operating reliability of the power converter under the low voltage ride-through of the power grid is improved.

Figure 3:
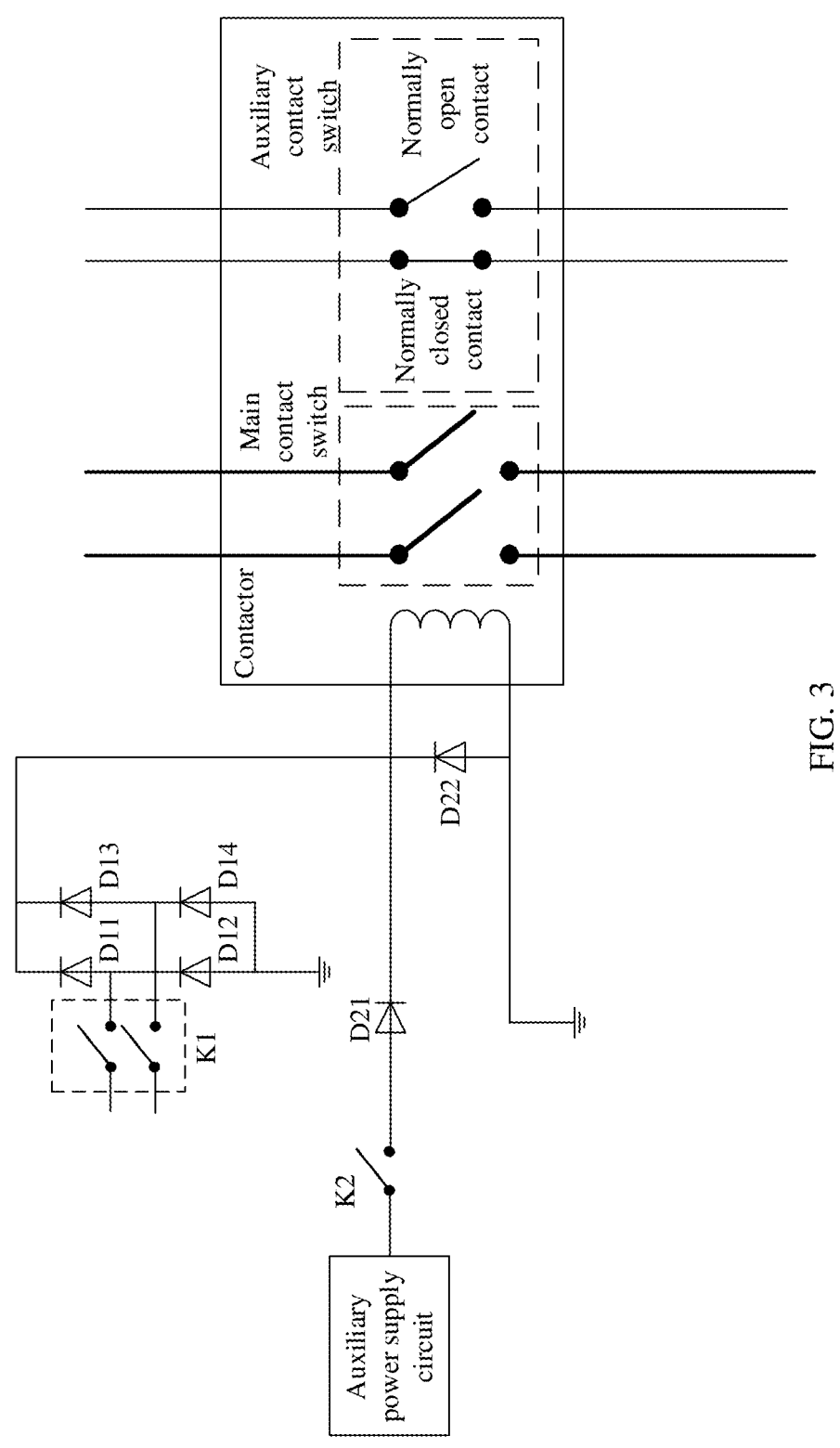
FIG. 3 is a schematic of a structure of a backup apparatus according to the embodiments.

The following describes, by using examples with reference to FIG. 1 to FIG. 6, a backup apparatus provided in embodiments. FIG. 3 is a schematic of a structure of the backup apparatus according to the embodiments. The backup apparatus shown in FIG. 3 includes a first rectifier circuit. The first rectifier circuit may be a bridge rectifier circuit or another circuit having a rectification function. For example, the first rectifier circuit may be a bridge rectifier circuit. As shown in FIG. 3, the first rectifier circuit includes four diodes (which may be represented as a diode D11, a diode D12, a diode D13, and a diode D14 for case of description). The diode D11 and the diode D12 that are connected in series are connected in parallel to the D11 and the diode D12 are connected in series. A connection end between the diode D11 and the diode D12 and a connection end between the diode D13 and the diode D14 each are connected to a first switch (which may be represented as a switch K1 for case of description). A connection end between the diode D12 and the diode D14 is grounded, and a connection end between the diode D11 and the diode D13 is connected to a contactor. The first rectifier circuit is connected to a power grid through switches K1. When the switches K1 are turned on, the first rectifier circuit may convert an alternating current from the power grid into a direct current to supply power to a coil. For example, when a positive half cycle of the alternating current is input into the first rectifier circuit, D11 and D14 are conducted, and D12 and D13 are cut off. When a negative half cycle of the alternating current is input into the first rectifier circuit, D12 and D13 are conducted, and D11 and D14 are cut off. Through alternation in this way, unidirectional conductivity of the diode can be used to transform an alternating current voltage with positive and negative variations into a unidirectional pulsating voltage (or may be referred to as a half-wave rectified sine wave). Further, the backup apparatus includes the contactor. As shown in FIG. 3, the contactor includes the coil, a main contact switch, and an auxiliary contact switch. A first end of the main contact switch is configured to connect to the power grid, and a second end of the main contact switch is configured to connect to an output of a power converter. A first end of the coil is connected to the connection end between the diode D11 and the diode D13 in the first rectifier circuit, and a second end of the coil is grounded. For example, the coil may be wound around an iron core. When the coil is not energized, the main contact switch is kept off (where the main contact switch may be kept off under elastic force of a spring), a normally open contact in the auxiliary contact switch is open, and a normally closed contact in the auxiliary contact switch is closed. After the coil of the contactor is energized, a current in the coil generates a magnetic field, and the generated magnetic field enables a static iron core to generate electromagnetic attraction force to compress the spring, to drive the main contact switch to be turned on, the normally open contact in the auxiliary contact switch to be closed, and the normally closed contact in the auxiliary contact switch to be open. The first end of the coil is further connected to an auxiliary power supply circuit through a second switch (which may be represented as a switching transistor K2 for ease of description). When the switches K1 are turned on, the first rectifier circuit is configured to convert the alternating current from the power grid into the direct current to supply power to the coil, so that electromagnetic force is generated on the iron core around which the coil is wound, to drive the main contact switch to be turned on. The first rectifier circuit may output a half-wave rectified sine wave, or output a filtered direct current voltage. After the main contact switch is turned on, the power converter is connected to the power grid. After the main contact switch is turned on, the controller controls the switching transistor K2 to be turned on and the switches K1 to be turned off, so that the auxiliary power supply circuit converts an alternating current from the power grid or the power converter into a direct current to supply power to the coil, to keep the main contact switch on. When a voltage of the power grid is not lower than a voltage threshold, an input capacitor in the auxiliary power supply circuit stores electric energy based on power supply of the power grid. When the voltage of the power grid is lower than the voltage threshold, the auxiliary power supply circuit supplies power to the coil by using the electric energy stored in the input capacitor. When the voltage of the power grid is lower than the voltage threshold and duration in which the voltage of the power grid is lower than the voltage threshold is greater than specified time, the controller controls the switching transistor K2 to be turned off. Therefore, the coil is de-energized, the main contact switch is turned off again, and the power converter runs off-grid. Herein, the controller may control, based on a voltage change of the power grid, whether the coil in the contactor is energized, so that the power converter switches to a grid-connected state or an off-grid state. In addition, when low voltage ride-through occurs in the power grid, the auxiliary power supply circuit supplies power to the coil by using the electric energy stored in the input capacitor. Therefore, the power converter can also be kept grid-connected during the low voltage ride-through of the power grid, and operating reliability of the power converter under the low voltage ride-through of the power grid is improved.

In some implementations, the controller is configured to: after the main contact switch in the contactor is turned on, control the second switch to be turned on, and after keeping the second switch on for preset time, control the first switch to be turned off. Herein, when the first switch is turned on, the first rectifier circuit converts the alternating current from the power grid into the direct current to supply power to the coil, so that the electromagnetic force is generated on the iron core around which the coil is wound, to drive the main contact switch to be turned on. After the main contact switch is turned on, the controller controls the second switch to be turned on. It takes a specific period of time for the auxiliary power supply circuit connected to the second switch to obtain power from the power grid and output a direct current. Therefore, to avoid a case in which the main contact switch is turned off due to insufficient power supply to the coil when the first switch is turned off, after the second switch is turned on and is kept on for the preset time, the first switch is controlled to be turned off. This further ensures grid connection reliability of the power converter.

In some implementations, the backup apparatus may include a first diode (configured to prevent a high voltage from entering a low-voltage system) and a second diode (configured to avoid an abrupt change of a current on an inductor after K1 is turned off). Still refer to FIG. 3. The backup apparatus shown in FIG. 3 may include the first diode (which may be represented as a diode D21 for case of description) and the second diode (which may be represented as a diode D22 for case of description). An anode of the diode D21 is connected to the switching transistor K2, a cathode of the diode D21 is connected to the first end of the coil in the contactor, an anode of the diode D22 is connected to the second end of the coil, and a cathode of the diode D22 is connected to the first end of the coil. The diode D21 can prevent a high-voltage direct current output by the first rectifier circuit from entering the auxiliary power supply circuit, and avoid damage to the auxiliary power supply circuit caused by current backflow. The diode D22 can form a freewheeling path with the coil in a process from energizing to de-energizing the coil, to avoid an abrupt change of a current on the coil after the switches K1 are turned off.

Figure 4:
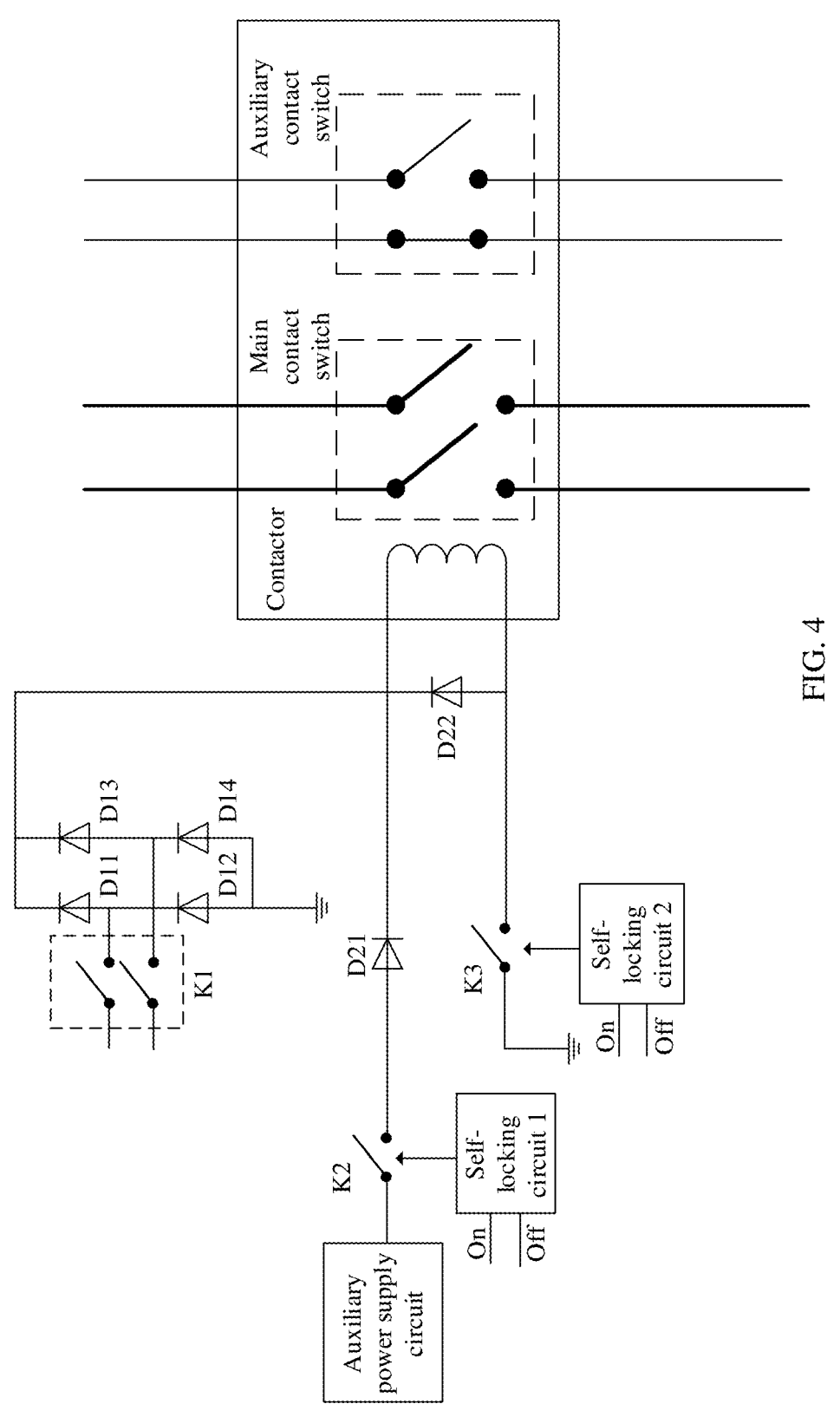
FIG. 4 is a schematic of another structure of a backup apparatus according to the embodiments.

In some implementations, the backup apparatus may include a third switch, the third switch may be a switching transistor, and the third switch is connected in series between the first rectifier circuit and the coil. FIG. 4 is a schematic of another structure of the backup apparatus according to the embodiments. In the backup apparatus shown in FIG. 4, the second end of the coil may be grounded through the third switch (which may be represented as a switching transistor K3 for case of description). The controller is configured to: before the switches K1 are turned on, control the switching transistor K3 to be turned on; and when the power converter is switched to be off-grid, in other words, after controlling the switching transistor K2 to be turned off, control the switching transistor K3 to be turned off. In addition, the controller is further configured to: when the voltage of the power grid is higher than a safety threshold, control the third switch to be turned off. Herein, because the second end of the coil may be grounded through the switching transistor K3, when a short-circuit fault occurs on the switches K1, the switches K1 cannot be normally turned off, and consequently a high-voltage current enters the coil. The controller may turn off the switching transistor K3 when detecting that the voltage of the power grid is excessively high, to avoid further component damage caused by the excessively high voltage of the power grid.

In some implementations, the second switch and the third switch in the backup apparatus each may be connected to a self-locking circuit. Still refer to FIG. 4. The switching transistor K2 and the switching transistor K3 in the backup apparatus shown in FIG. 4 are respectively connected to a self-locking circuit 1 and a self-locking circuit 2. The self-locking circuit 1 and the self-locking circuit 2 each include an on port and an off port. The self-locking circuit 1 is used as an example. When a control signal sent by the controller to an on port of the self-locking circuit 1 is a pulse with a width of 50 ms, the self-locking circuit 1 outputs a high-level signal to turn on the switching transistor K2. When a control signal sent by the controller to an off port of the self-locking circuit 1 is a pulse with a width of 50 ms, the self-locking circuit 1 outputs a low-level signal to turn off the switching transistor K2. For example, after the controller sends, to on ports of the self-locking circuit 1 and the self-locking circuit 2, control signals that are pulses with a width of 50 ms, the switching transistor K2 and the switching transistor K3 remain on; and when an output of the controller is abnormally pulled down, outputs of the self-locking circuit 1 and the self-locking circuit 2 still remain at a high level. For example, the power supply system is upgraded when the switching transistor K2 and the switching transistor K3 are turned on, and the controller in the backup apparatus is reset when being restarted. In this case, the switching transistor K2 and the switching transistor K3 may remain on under output control of the self-locking circuit 1 and the self-locking circuit 2. This avoids abnormal grid connection of the power converter in a restart process of the controller.

Figure 5:
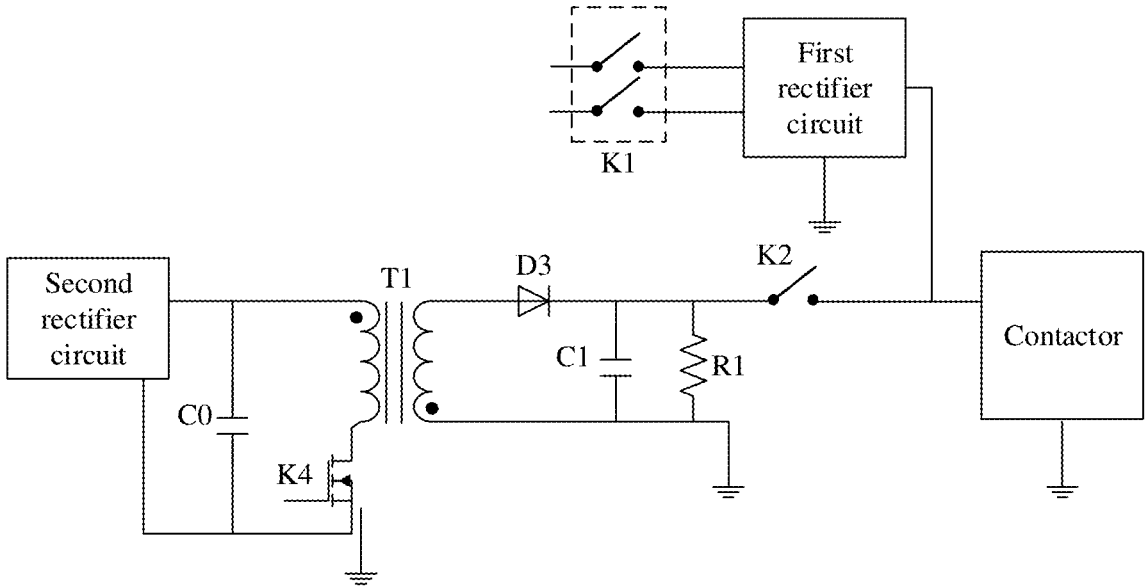
FIG. 5 is a schematic of another structure of a backup apparatus according to the embodiments.

In some implementations, the auxiliary power supply circuit in the backup apparatus may include a second rectifier circuit and a buck circuit. An input of the second rectifier circuit is connected to the power grid or the power converter, an output of the second rectifier circuit is connected to an input capacitor in the buck circuit, and an output of the buck circuit is connected to the second switch. The second rectifier circuit is configured to: convert the alternating current from the power grid or the power converter into the direct current, and then output the direct current to the buck circuit, so that the buck circuit outputs a bucked direct current (which may be a 12 V direct current) to the coil when the second switch is turned on. The second rectifier circuit may be a bridge rectifier circuit or another circuit having a rectification function, and the buck circuit may be a flyback circuit or another circuit having a buck function. For example, the buck circuit is a flyback circuit. FIG. 5 is a schematic of another structure of the backup apparatus according to the embodiments. In the backup apparatus shown in FIG. 5, the auxiliary power supply circuit may include the second rectifier circuit and the buck circuit. One end of the input capacitor (which may be represented as a capacitor C0 for ease of description) in the buck circuit is connected to one end of a primary winding of a transformer T1, the other end of the capacitor C0 is connected to the other end of the primary winding of the transformer T1 through a switching transistor K4, and a connection end between the capacitor C0 and the switching transistor K4 is grounded. An anode of a diode D3 is connected to one end of a secondary winding of the transformer T1, a cathode of the diode D3 is connected to the other end of the secondary winding of the transformer T1 through a capacitor C1, and a resistor R1 is connected in parallel to two ends of the capacitor C1. A connection end between the capacitor C0 and the primary winding of the transformer T1 is connected to the second rectifier circuit, and a connection end between the diode D3 and the capacitor C1 is connected to the contactor through the switching transistor K2. Herein, when the voltage of the power grid is normal, the second rectifier circuit converts the alternating current from the power grid or the power converter into the direct current, and then outputs the direct current to the buck circuit; the buck circuit outputs a low-voltage direct current to maintain power supply to the coil, to reduce heat generated by the coil during conduction of the contactor; and the capacitor C0 stores electric energy based on the direct current output by the second rectifier circuit. When the low voltage ride-through occurs in the power grid, power is supplied to the coil by using the electric energy stored in the capacitor C0. Low voltage ride-through duration of the power grid is short, and the electric energy stored in the capacitor C0 can ensure that power is continuously supplied to the coil within a specific period of time. Therefore, during the low voltage ride-through of the power grid, the main contact switch is kept on to keep the power converter grid-connected, so that the operating reliability of the power converter under the low voltage ride-through of the power grid is improved.

Figure 6:
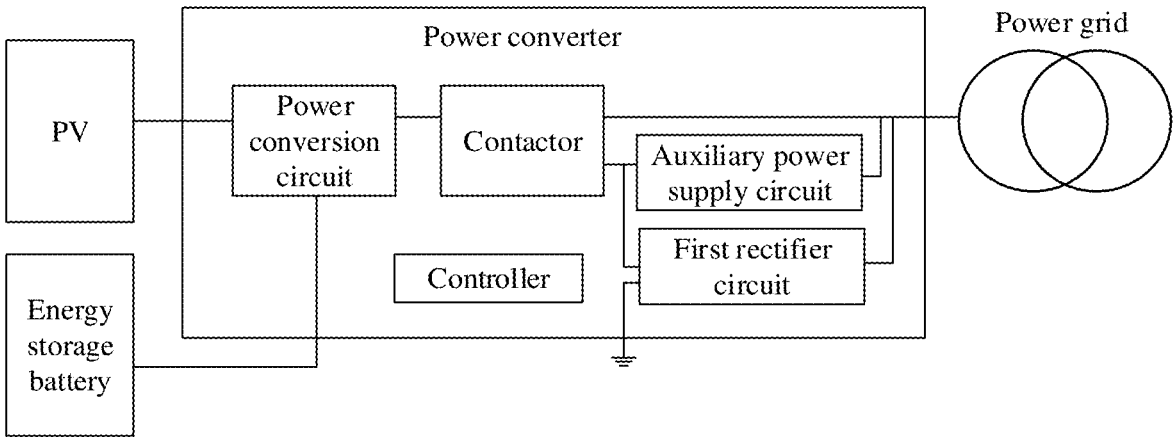
FIG. 6 is a diagram of another structure of a power supply system according to the embodiments.

In some implementations, the backup apparatus may be integrated inside the power converter. In other words, the power converter may include a power conversion circuit, the backup apparatus, and the controller. FIG. 6 is a diagram of another structure of a power supply system according to the embodiments. The power supply system shown in FIG. 6 includes a photovoltaic module PV, an energy storage battery, and a power converter. The power converter may include a power conversion circuit, a backup apparatus, and a controller. An input of the power conversion circuit in the power converter is configured to connect to the photovoltaic module PV and the energy storage battery, and an output of the power conversion circuit is configured to connect to a power grid through the backup apparatus. The backup apparatus may include a contactor, a first rectifier circuit, and an auxiliary power supply circuit. An input of the first rectifier circuit is connected to the power grid through a first switch (not shown in FIG. 6), a positive output of the first rectifier circuit is connected to a first end of a coil (not shown in FIG. 6) in the contactor, a negative output of the first rectifier circuit is grounded, the first end of the coil is further connected to the auxiliary power supply circuit through a second switch (not shown in FIG. 6), and a second end of the coil is grounded. When the first switch is turned on, the first rectifier circuit is configured to convert an alternating current from the power grid into a direct current to supply power to the coil, so that electromagnetic force is generated on an iron core around which the coil is wound, to drive a main contact switch to be turned on. After the main contact switch is turned on, the power converter is connected to the power grid, in other words, operates in a grid-connected mode. After the main contact switch is turned on, the controller controls the second switch to be turned on and the first switch to be turned off, so that the auxiliary power supply circuit converts an alternating current from the power grid or the power converter into a direct current to supply power to the coil, to keep the main contact switch on. Herein, when a voltage of the power grid is normal, an input capacitor in the auxiliary power supply circuit stores electric energy based on power supply of the power grid. When low voltage ride-through occurs in the power grid, the auxiliary power supply circuit supplies power to the coil by using the electric energy stored in the input capacitor. Low voltage ride-through duration of the power grid is short, and the electric energy stored in the input capacitor can ensure that power is continuously supplied to the coil within a specific period of time. Therefore, during the low voltage ride-through of the power grid, the main contact switch is kept on to keep the power converter grid-connected, so that operating reliability of the power converter under the low voltage ride-through of the power grid is improved.

In the embodiments, when the first switch is turned on, the first rectifier circuit in the backup apparatus converts the alternating current from the power grid into the direct current to supply power to the coil, so that the electromagnetic force is generated on the iron core around which the coil is wound, to drive the main contact switch to be turned on. After the main contact switch is turned on, the power converter is connected to the power grid, in other words, operates in the grid-connected mode. After the main contact switch is turned on, the controller in the backup apparatus controls the second switch to be turned on and the first switch to be turned off, so that the auxiliary power supply circuit converts the alternating current from the power grid or the power converter into the direct current to supply power to the coil, to keep the main contact switch on. When the low voltage ride-through occurs in the power grid, the auxiliary power supply circuit supplies power to the coil by using the electric energy stored in the input capacitor. The low voltage ride-through duration of the power grid is short, and the electric energy stored in the input capacitor can ensure that power is continuously supplied to the coil within the specific period of time. Therefore, during the low voltage ride-through of the power grid, the main contact switch is kept on to keep the power converter grid-connected, so that the operating reliability of the power converter under the low voltage ride-through of the power grid is improved.

It should be appreciated that the embodiments and implementations described herein are merely exemplary, and should not be considered as limiting. Any variation or modification made by a person of ordinary skill in the art should be considered to fall withing the scope of the embodiments.

The invention claimed is:

1. A backup apparatus comprising:
a contactor,
a first rectifier circuit,
an auxiliary power supply circuit,
a first switch,
a second switch, and
a controller comprising:
a coil and
a main contact switch, wherein the main contact switch is connected between a power grid and a power converter, an input of the first rectifier circuit is connected to the power grid through the first switch, an output of the first rectifier circuit is connected to the coil, the coil is further connected to the auxiliary power supply circuit through the second switch, and the power converter comprises a photovoltaic inverter and a power conversion system;
the first rectifier circuit is configured to: when the first switch is turned on,
convert an alternating current from the power grid into a direct current to supply power to the coil, to turn on the main contact switch;
the controller is configured to: after the main contact switch is turned on,
control the second switch to be turned on and the first switch to be turned off, so that the auxiliary power supply circuit converts an alternating current from the power grid or the power converter into a direct current to supply power to the coil, to keep the main contact switch on; and
the auxiliary power supply circuit comprises an input capacitor, and when the second switch is turned on, the input capacitor supplies power to the coil when a voltage of the power grid is lower than a voltage threshold.

2. The backup apparatus according to claim 1, wherein the auxiliary power supply circuit further comprises:
a second rectifier circuit, and
a buck circuit that are connected in series, the buck circuit comprises the input capacitor, the input capacitor is connected to an output of the second rectifier circuit, the second rectifier circuit is further configured to:
convert the alternating current from the power grid or the power converter into the direct current, and the buck circuit is further configured to:
reduce a voltage of the direct current from the second rectifier circuit and
transmit a bucked direct current to the coil.

3. The backup apparatus according to claim 1, wherein the backup apparatus further comprises a third switch connected in series between the first rectifier circuit and the coil, and the controller is further configured to:
control, when the voltage of the power grid is higher than a safety threshold, the third switch to be turned off.

4. The backup apparatus according to claim 2, wherein the backup apparatus further comprises a third switch connected in series between the first rectifier circuit and the coil, and the controller is further configured to:
control, when the voltage of the power grid is higher than a safety threshold, the third switch to be turned off.

5. The backup apparatus according to claim 3, wherein the backup apparatus further comprises a first diode, an anode of the first diode is connected to the second switch, and a cathode of the first diode is connected to the coil.

6. The backup apparatus according to claim 5, wherein the backup apparatus further comprises a second diode connected in parallel to the coil.

7. The backup apparatus according to claim 1, wherein the controller is further configured to: after the voltage of the power grid is lower than the voltage threshold and a specified time is exceeded,
control the second switch to be turned off.

8. The backup apparatus according to claim 2, wherein the controller is further configured to: after the voltage of the power grid is lower than the voltage threshold and a specified time is exceeded,
control the second switch to be turned off.

9. The backup apparatus according to claim 3, wherein the controller is further configured to: after the voltage of the power grid is lower than the voltage threshold and a specified time is exceeded,
control the second switch to be turned off.

10. The backup apparatus according to claim 1, wherein the controller is further configured to: after the main contact switch is turned on,
control the second switch to be turned on; and, after keeping the second switch on for a preset time,
control the first switch to be turned off.

11. The backup apparatus according to claim 2, wherein the controller is further configured to: after the main contact switch is turned on,
control the second switch to be turned on; and, after keeping the second switch on for a preset time,
control the first switch to be turned off.

12. The backup apparatus according to claim 3, wherein the controller is further configured to: after the main contact switch is turned on,
control the second switch to be turned on; and, after keeping the second switch on for a preset time,
control the first switch to be turned off.

13. A power converter comprising:
an inverter circuit configured to convert a direct current from a photovoltaic module into an alternating current;
a backup apparatus comprising a contactor, a first rectifier circuit, a first switch, a second switch, and an auxiliary power supply circuit; and
a controller, wherein the inverter circuit is configured to convert a direct current from a photovoltaic module or an energy storage battery into an alternating current, the backup apparatus comprises a contactor, a first rectifier circuit, a first switch, a second switch, and an auxiliary power supply circuit, the contactor comprises a coil and a main contact switch, the main contact switch is connected between a power grid and the inverter circuit, an input of the first rectifier circuit is connected to the power grid through the first switch, an output of the first rectifier circuit is connected to the coil, and the coil is further connected to the auxiliary power supply circuit through the second switch;
the first rectifier circuit is configured to: when the first switch is turned on,
convert an alternating current from the power grid into a direct current to supply power to the coil, to turn on the main contact switch;
the controller is configured to: after the main contact switch is turned on,
control the second switch to be turned on and the first switch to be turned off, so that the auxiliary power supply circuit converts an alternating current from the power grid into a direct current to supply power to the coil, to keep the main contact switch on; and the auxiliary power supply circuit comprises an input capacitor, and when the second switch is turned on, the input capacitor supplies power to the coil when a voltage of the power grid is lower than a voltage threshold.

14. The power converter according to claim 13, wherein the auxiliary power supply circuit further comprises:

a second rectifier circuit, and a buck circuit that are connected in series, the buck circuit comprises the input capacitor, the input capacitor is connected to an output of the second rectifier circuit, the second rectifier circuit is further configured to:

convert the alternating current from the power grid into the direct current, and the buck circuit is further configured to:

reduce a voltage of the direct current from the second rectifier circuit and transmit a bucked direct current to the coil.

15. The power converter according to claim 13, wherein the backup apparatus further comprises a third switch connected in series between the first rectifier circuit and the coil, and the controller is further configured to:

control, when the voltage of the power grid is higher than a safety threshold, the third switch to be turned off.

16. The power converter according to claim 14, wherein the backup apparatus further comprises a third switch connected in series between the first rectifier circuit and the coil, and the controller is further configured to:

control, when the voltage of the power grid is higher than a safety threshold, the third switch to be turned off.

17. The power converter according to claim 15, wherein the backup apparatus further comprises a first diode, an anode of the first diode is connected to the second switch, and a cathode of the first diode is connected to the coil.

18. The power converter according to claim 16, wherein the backup apparatus further comprises a first diode, an anode of the first diode is connected to the second switch, and a cathode of the first diode is connected to the coil.

19. The power converter according to claim 17, wherein the backup apparatus further comprises a second diode connected in parallel to the coil.

20. The power converter according to claim 13, wherein the auxiliary power supply circuit further comprises:

a second rectifier circuit, and a buck circuit that are connected in series, the buck circuit comprises the input capacitor, the input capacitor is connected to an output of the second rectifier circuit, the second rectifier circuit is further configured to:

convert the alternating current from the power converter into the direct current, and the buck circuit is further configured to:

reduce a voltage of the direct current from the second rectifier circuit and transmit a bucked direct current to the coil.

* * * * *